United States Patent [19]

Hindin et al.

[11] 4,311,244

[45] Jan. 19, 1982

[54] AUTOMATIC COUPLER TO CONNECT CONVERTIBLE RAIL-HIGHWAY VEHICLES END TO END

[75] Inventors: Eugene Hindin, Bala Cynwyd, Pa.; Alan R. Cripe; Christopher A. Cripe, both of Richmond, Va.

[73] Assignee: Bi-Modal Corporation, Greenwich, Conn.

[21] Appl. No.: 125,506

[22] Filed: Feb. 28, 1980

[51] Int. Cl.³ .................... B60F 1/04; B61D 3/10; B61G 1/02; B61G 5/00
[52] U.S. Cl. .................................. 213/86; 105/3; 105/215 C; 213/200; 280/515
[58] Field of Search ............... 105/3, 4 R, 215 C; 213/86, 200; 280/514, 515

[56] References Cited

U.S. PATENT DOCUMENTS

| | | | |
|---|---|---|---|
| 415,194 | 11/1889 | Follansbee | 213/86 |
| 1,848,956 | 3/1932 | Koehler | 280/514 X |
| 2,889,785 | 6/1959 | Browne | 105/215 C |
| 2,925,791 | 2/1960 | Browne et al. | 105/215 C |
| 3,002,469 | 10/1961 | Wanner | 105/215 C |
| 3,286,657 | 11/1966 | Browne | 105/215 C |
| 3,326,575 | 6/1967 | Shepley | 280/515 |
| 3,342,141 | 9/1967 | Browne | 105/215 C |
| 3,542,400 | 11/1970 | Mason, Jr. | 280/515 X |
| 4,202,277 | 5/1980 | Browne et al. | 105/215 C |
| 4,202,454 | 5/1980 | Browne et al. | 213/86 |

*Primary Examiner*—Joseph F. Peters, Jr.
*Assistant Examiner*—Howard Beltran
*Attorney, Agent, or Firm*—Max R. Millman

[57] ABSTRACT

A coupler to connect rail-highway vehicles end to end including a female member at the end of one vehicle into which extends a sensing member, a male member at the end of an adjacent vehicle adapted to enter the female member, the male member including a vertical hole therethrough, and linkage connecting the sensing member with a vertical locking pin so that as the male member approaches its fully inserted position in the female member it contacts the sensing member and actuates the linkage to automatically urge the vertical locking pin through the vertical hole, the assembly being such that the weight of the vertical locking pin cannot retract from the vertical hole and cause an unlocking action to occur. In the uncoupling action, the vertical locking pin is first retracted and upon full withdrawal of the male member, the sensing member reenters the female member, the entire assembly then being reset for automatic coupling when necessary.

8 Claims, 8 Drawing Figures

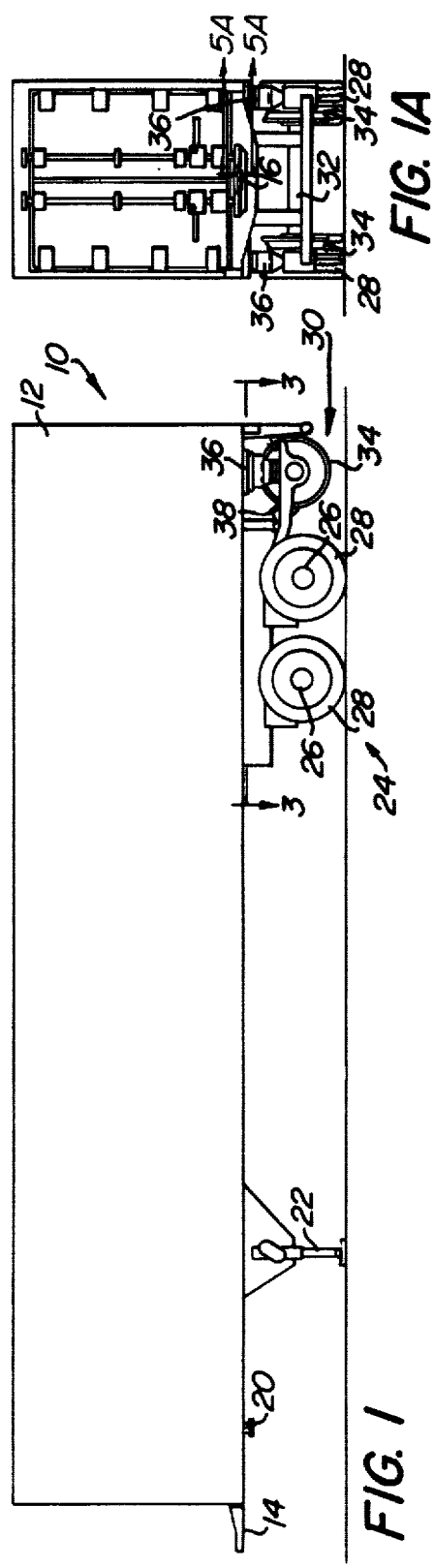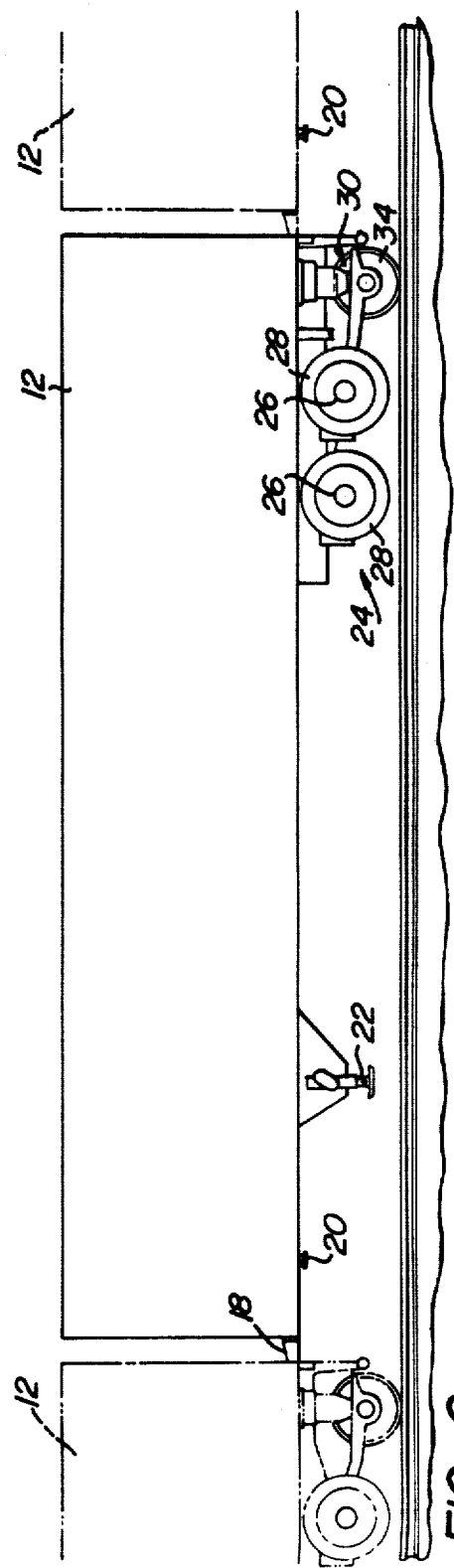

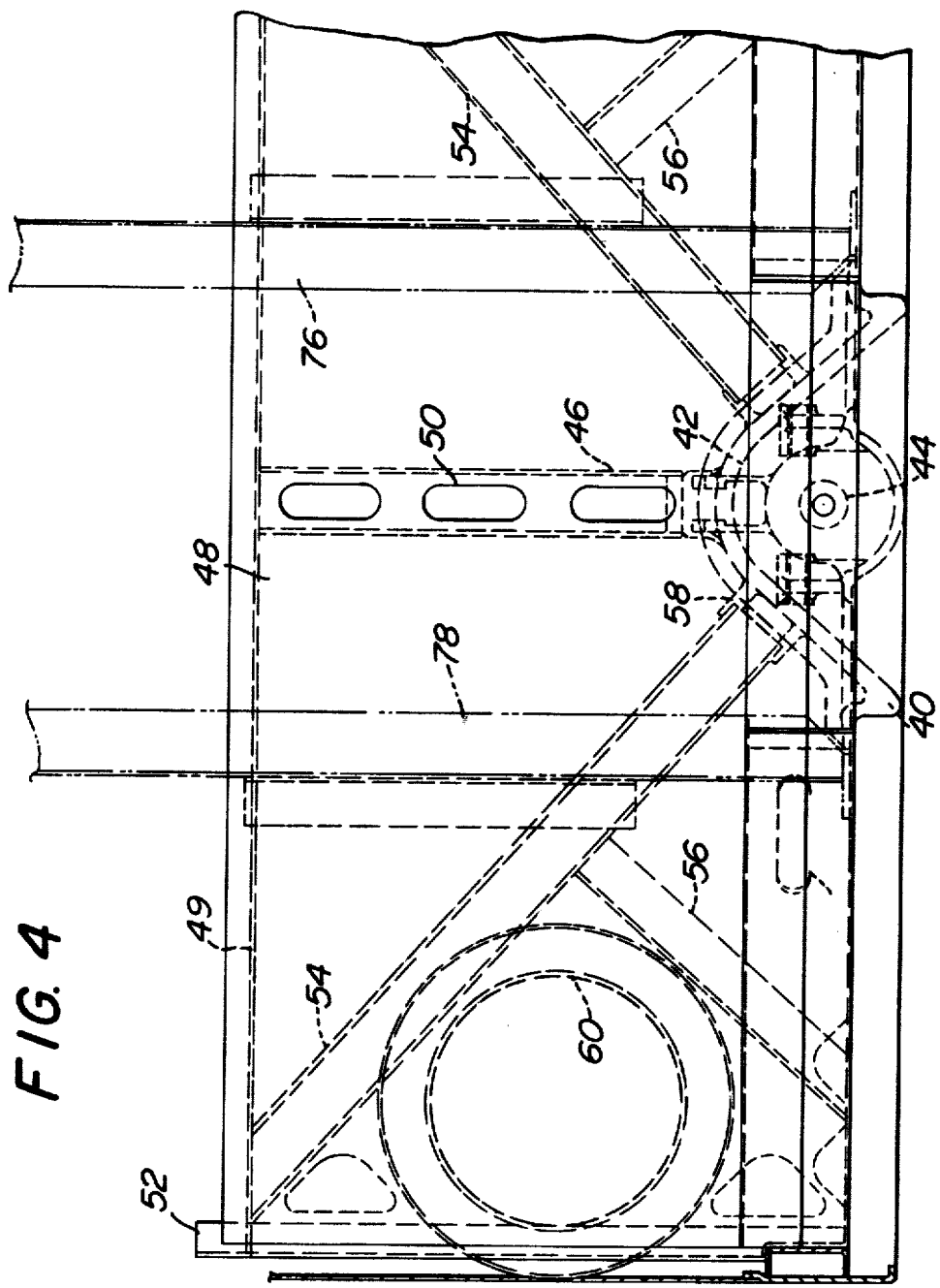

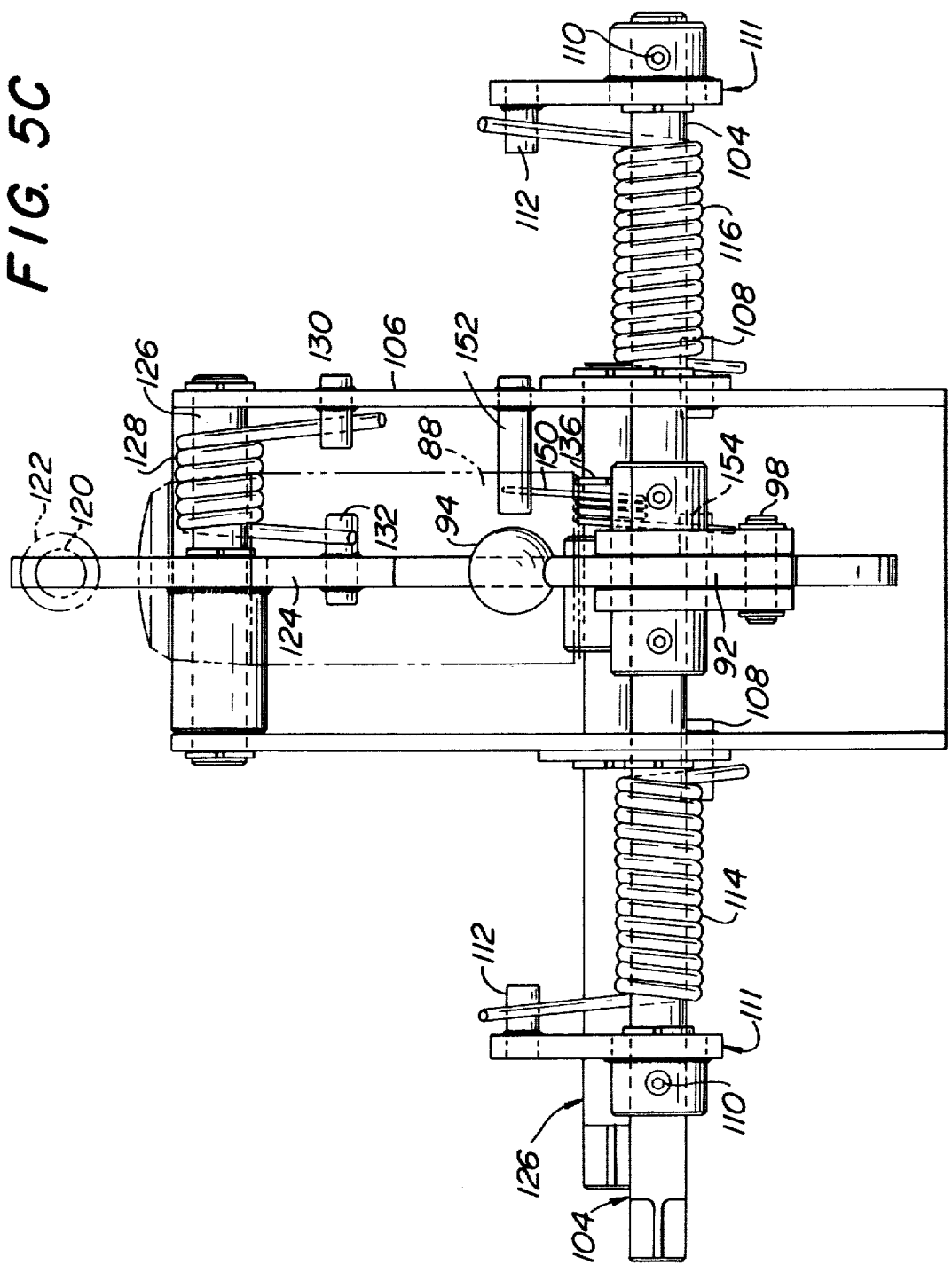

AUTOMATIC COUPLER TO CONNECT CONVERTIBLE RAIL-HIGHWAY VEHICLES END TO END

This application is related to copending application, Ser. No. 810,120, filed June 27, 1977, now U.S. Pat. No. 4,202,277 which is directed to a convertible rail-highway semi-trailer.

Said related application covers a body which is supported by air springs on a rail wheel-set axle unit and on a highway wheel-set axle unit adjacent the rear of the body, these units being connected to the body independently of each other, and valve and conduits interconnecting a source of compressed air with the air springs to selectively inflate and deflate the air springs and thereby raise the rail wheel-set axle unit into an elevated inoperative position and lower the highway wheel-set axle unit into ground-engaging position for the highway mode and vice versa, a mechanism to lift and retain the rail wheel-set axle unit in its elevated stored inoperative position in the highway mode, another mechanism to lift and retain the highway wheel-set axle unit in its elevated stored inoperative position in the rail mode wherein the flanged rail wheels are in the track-engaging position, and couplers to secure the bodies end to end in the rail mode.

The instant invention relates to the end-to-end couplers which is also described in Ser. No. 810,120 and claimed in divisional application Ser. No. 937,479 filed Aug. 28, 1978, now U.S. Pat. No. 4,202,454. The coupler disclosed in said related and divisional applications, designed to achieve a train configuration to carry vertical loads of about 25,000 pounds and at the same time allow limited rolling, pitching and yaw actions between the coupled vehicles combines a male and female member and a locking mechanism including a locking pin which is manually operated to enter a vertical hole in the male member.

The primary object of this invention is to provide a coupler which is essentially the same as that disclosed in the related and divisional applications but which includes a locking device in which the vertical locking pin is automatically extended into the vertical hole of the male member when the latter reaches its fully inserted position in the female member.

Another object of the invention is to provide an automatic coupler of the character described in which the vertical locking pin is manually retracted and then latched in its retracted position by the operating linkage to allow insertion of the male member into the female member.

Another object of the invention is to provide an automatic coupler of the character described which includes a sensing member extending into the female member and linkage operatively connecting the sensing member and the vertical locking pin whereby as the male member approaches its fully inserted position in the female member, it engages the sensing member and actuates the linkage to cause the vertical locking pin to automatically enter the vertical hole in the male member.

Another object of the invention is to provide an automatic coupler of the character described in which the linkage operatively connecting the sensing member and the vertical locking pin includes a toggle action operation to provide sufficiently large forces on the vertical locking pin to insure its complete upward movement and full engagement in the vertical hole of the male member.

Another object of the invention is to provide an automatic coupler of the character described in which the linkage operatively connecting the sensing member and vertical locking pin travels over center so that when the vertical locking pin is in the vertical hole of the male member, its weight cannot cause the same to retract from the hole and thereby cause an unlocking action to occur.

Yet another object of the invention is to provide an automatic coupler of the character described in which uncoupling of the vehicles is effected by manually retracting the vertical locking pin which is then held in its retracted position until the male coupler is withdrawn enough to allow the sensing member in the female coupler to extend to its normal position, thereby unlatching the vertical locking pin which will automatically return to its upper or closed position.

These and other objects of the invention will become more apparent as the following description proceeds in conjunction with the accompanying drawings, wherein:

FIG. 1 is a diagrammatic side elevational view of the vehicle shown ready to be coupled to a tractor for the highway mode operation;

FIG. 1A is a rear elevational view of the vehicle in the highway mode;

FIG. 2 is a view similar to FIG. 1 of the vehicle in the railway mode operation with the vehicles coupled end to end to form a train;

FIG. 4 is a top plan view of the rear sill construction of the vehicle;

FIG. 5C is a side view taken from the line 5C—5C of FIG. 5A.

Specific reference is now made to the drawings in which similar reference characters are used for corresponding elements throughout.

Figure 3:
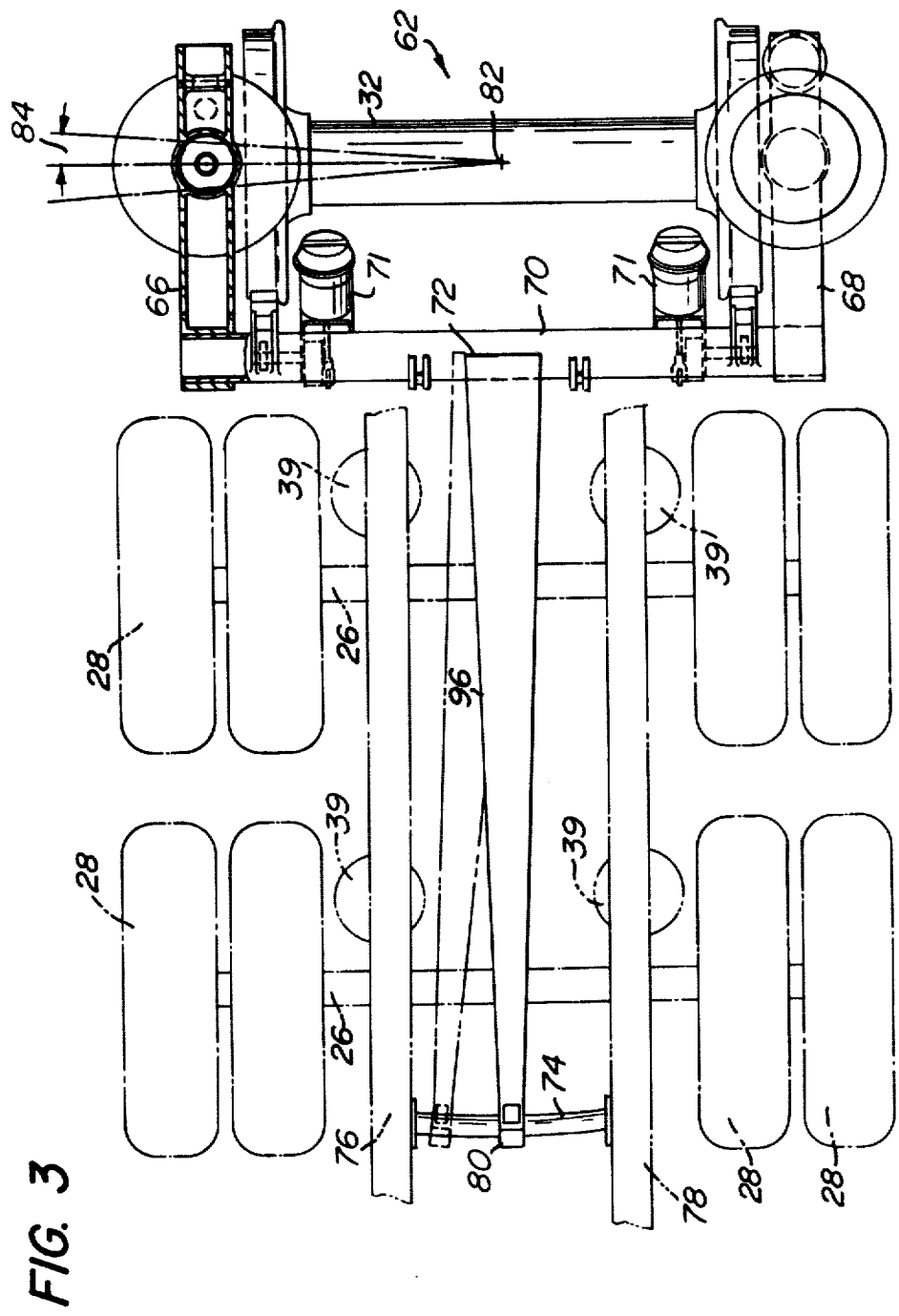
FIG. 3 is a plan view partially in section taken on the line 3—3 of FIG. 1 and showing the rail bogie with the highway axle and wheel assemblies shown in phantom.

Referring first to FIGS. 1, 1A and 2, the present vehicle is generally shown at 10 and includes a body 12 of conventional semi-trailer dimensions which could be 45 ft. long, having a male coupling member 14 at its front end, and a female member 16 at its rear end to receive the male coupler of an adjacent body as at 18 to form a train for the railroad mode of operation, as seen in FIG. 2. The vehicle also includes a convention kingpin 20 adjacent its front end for removable coupling to the fifth wheel of a tractor for the highway mode of operation, conventionally placed, telescoping semi-trailer landing gears 22, highway running gear 24 including tandem axles 26 (although a single axle suspension can be used) each axle mounting dual tired wheels 28, the running gear being suspended from the sub or underframe of the body towards the rear thereof by air-springs later to be described, the same constituting a highway wheel-set axle unit; and a railroad bogie or rail wheel-set axle unit 30, to be described in detail later, which includes a single axle 32 mounting a pair of flanged railroad wheels 34, at appropriate rail spacing transversely, the bogie being suspended by air-springs 36 from the vehicle body behind the highway running gear 24 and including a braking mechanism 38. The arrangement is such that by appropriate operation of pneumatic apparatus, to be described hereinafter, the air springs suspending the highway running gear may be inflated to lower the highway wheels 28 into engagement with a paved road while the air springs 36 of the railroad bogie are deflated so that the rail wheel-set axle unit or bogie may be raised into an elevated inoperative stored position as seen in FIG. 1, and by reversing this operation, the flanged railroad wheels 34 can be lowered to engage the track while the highway wheel-set axle unit is raised into an elevated inoperative stored position as shown in FIG. 2. In this latter railroad mode, the vehicle may be coupled as at 18 end to end to form a train to be pulled by a suitable locomotive. It will be understood that in the highway mode, when the highway wheels 28 engage the road and the flanged railroad wheels 34 are in the raised stored position, the landing gear 22 is in the load supporting position during which time a conventional tractor is coupled to the kingpin 20, the landing gear is telescoped to a raised position and the vehicle will then be driven as an over-the-road tractor-semi-trailer combination. The air bags supporting the body on the highway wheel-set axle unit are shown diagrammatically at 39 in FIG. 3 and are fully described in co-pending related application Ser. No. 810,120, now U.S. Pat. No. 4,202,277.

The rear sill structure shown in FIG. 4 includes a central casting 40 of generally "T" shape when viewed from the rear, a horizontal hole or slot 42 terminating in an arcuate wall adapted to receive the male coupling member extending from the front of an adjacent vehicle, a vertical bore 44 intercepting the slot adapted to receive a coupler locking pin and other parts required to accommodate the coupler pin and locking mechanism.

Extending longitudinally from the casting 40 and secured thereto as by welding is a web member 46 shown here as a channel. The upper or top plate 48 which extends the full width of the vehicle and about 36 in. into the same is welded to the top of the channel member 46 through openings 50. Extending longitudinally on both sides of the rear sill structure for bolting to the median portion of the side rail are side channel members 52, the side edges of top plate 48 being welded thereto along the top flanges of said side channels.

A bottom plate 51 is provided which is substantially coextensive with the top plate 48 and which is spaced vertically therebeneath, the bottom plate being welded to the bottom of the central channel member 46 and to the bottom flanges of the side channel members 52. Thus, the top and bottom plates form, in effect, a sandwich between which are welded diagonal braces 54 and 56, the diagonal braces 54 being secured at their outer ends as at 58 to the casing 40.

Inboard of and adjacent each side of the vehicle, there is a suitable opening 60 in the bottom plate 51. It is at these two locations that the air spring assemblies 36 of the railroad bogie 30 are connected to the body structure.

The bogie 30 which is shown in detail in FIG. 3 comprises a yoke 62 and a longitudinally extending tubular tongue 64 which is angulated so that its forwardly extending portion overlies and clears the highway wheel axles 26. The yoke comprises transversely spaced longitudinal forwardly extending side members 66 and 68, preferably of cast hollow rectangular configuration which are connected at their forward ends by a transversely extending tubular member 70. The tongue 64 is welded to the transverse tubular member of the yoke as at 72 centrally thereof. The member 70 mounts a suitable brake 71 for each railroad wheel.

At the location of the forward end of the tongue 64, which is about 10 ft. long, an arcuate tube 74 is secured to the running gear channels 76 and 78 of the vehicle extending transversely therebetween. The forward end of the tongue is provided with a split collar 80, retained by bolts. Thus, the bogie is allowed to self steer as the front end of the tongue is allowed to slide from side to side on the arcuate tube 74 so that the rail axle 32 is free to rotate about a vertical axis 82 at its center. The steering angle is limited by the length of the arcuate member 74 and is shown in phantom in FIG. 3 as 84. When the railroad brakes are applied the arcuate tube 80 supplies the longitudinal restraint, and also the vertical restraint to the forces produced by the brake torque. It will be understood that the arcuate tube 74 may be of any suitable cross-section.

Figure 5A:
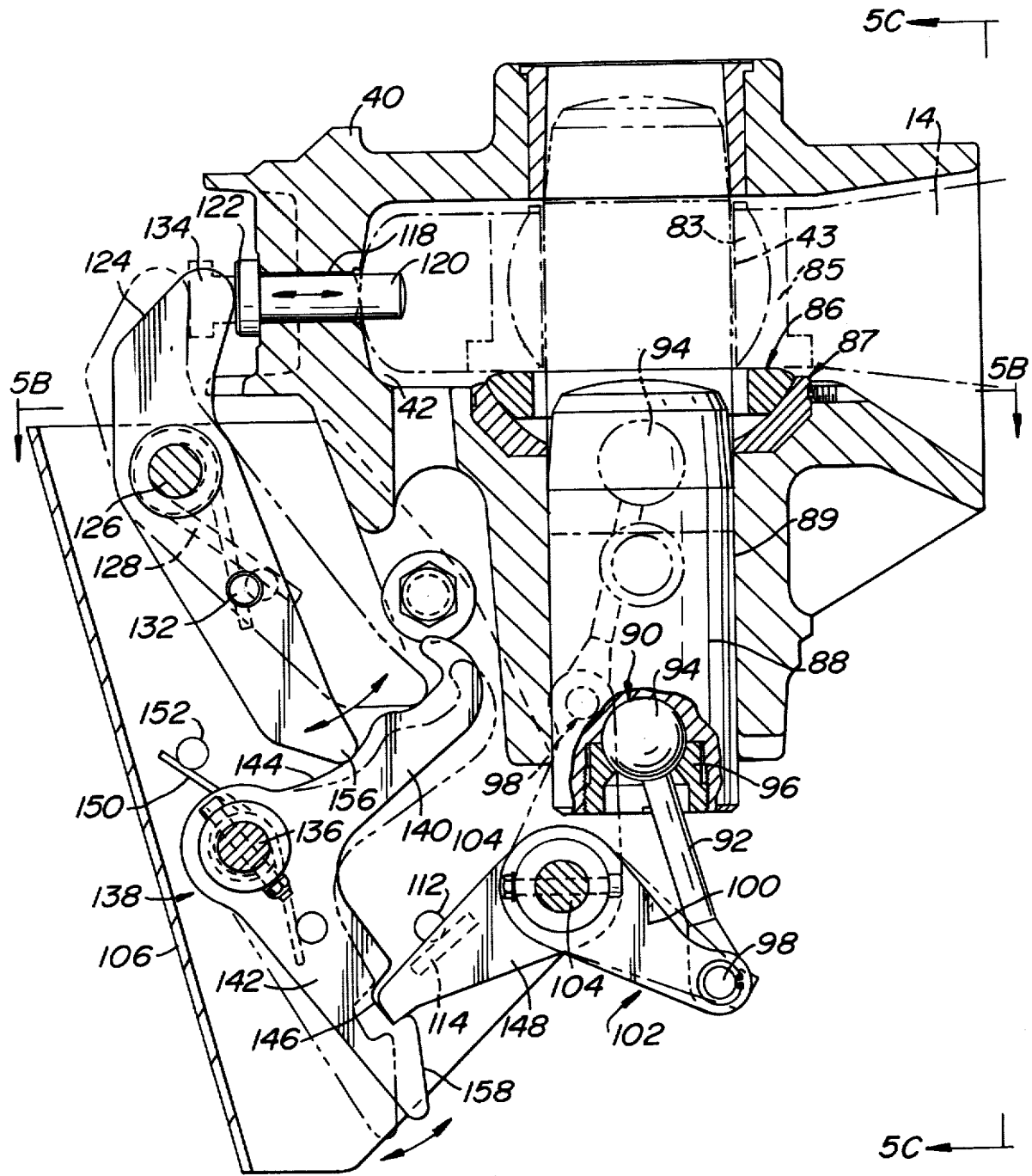
FIG. 5A is an enlarged sectional view taken on the line 5A—5A of FIG. 1A.
Figure 5B:
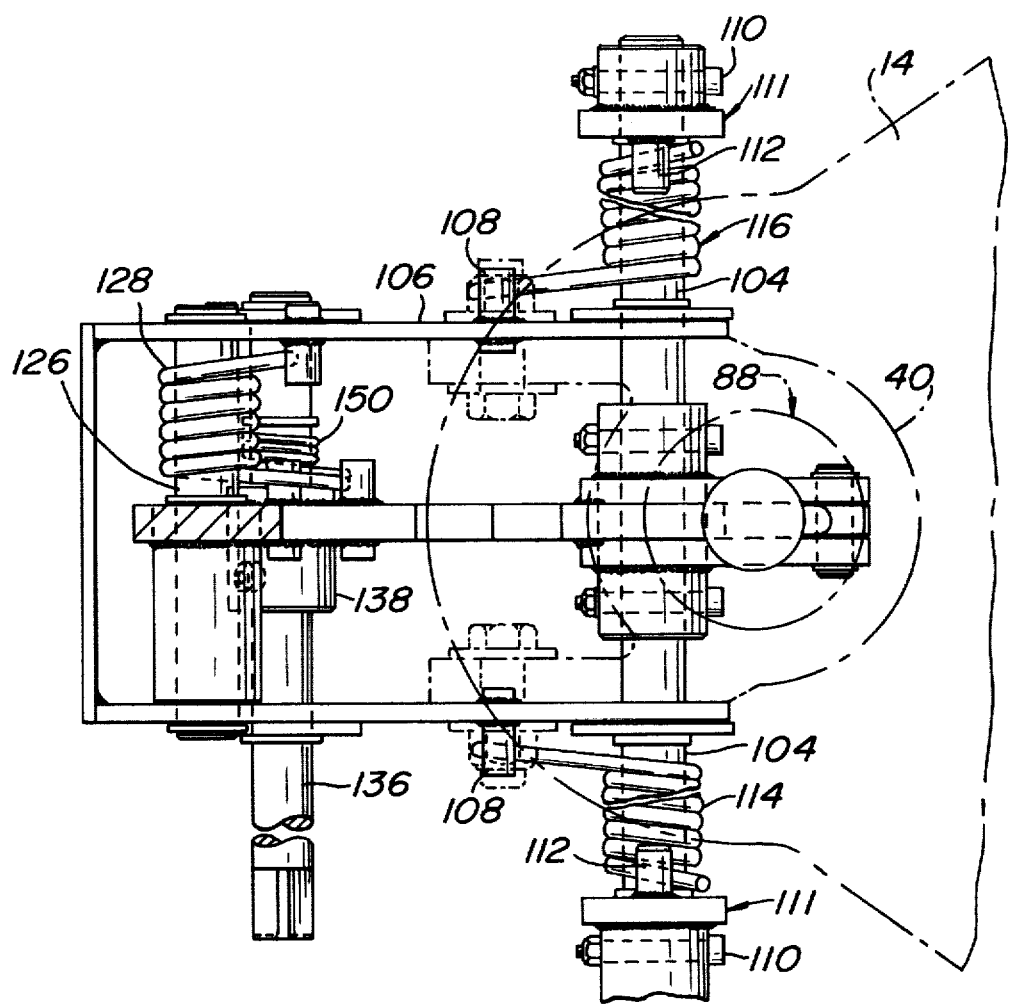
FIG. 5B is a plan view taken from the line 5B—5B of FIG. 5A.

The coupler of the instant invention is shown in detail in FIGS. 5A, 5B and 5C and is used to form a train of the vehicles by releasably coupling them end to end. The central portion of the rear sill construction, namely, the casting 40, is formed with a hole or slot 42 which opens through the rear end of the sill and whose outer face is flush therewith. The slot 42 is almost as wide as the casting 40 and is inwardly tapered. The male coupler 14 is tapered to conform to the taper of the female receiving slot but has a smaller included angle between its sides to allow limited horizontal rotation on the vertical locking pin 88. The central portion of the male coupler 14 includes a vertical hole 43 around which is a spherical bearing comprising an inner bushing 83 and an outer bushing 85. The bottom face of the male coupler rests on a spherical washer 86 on a spherical seat 87 to permit limited relative pitching and rolling motion between adjacent vehicles in the train as well as limited horizontal rotation on the coupling pin, all of which is shown and described in the aforesaid copending applications, now U.S. Pat. Nos. 4,202,277 and 4,202,454.

As will appear hereinafter, the instant coupler differs from that shown and described in the aforesaid applications, now U.S. Pat. Nos. 4,202, 277 and 4,202,454, in that the coupling action occurs automatically upon the entry of the male coupler 14 into the female slot 42.

A vertical locking pin 88 is provided for sliding movement in a vertical bore 89 of the casting 40 which communicates with the horizontal female slot 42. The pin 88 has a tapered upper end and a lower end which includes a recessed socket 90 into which extends a connecting link 92 whose upper end 94 is enlarged and substantially spherical and is pivotally connected to the vertical locking pin for movement about an axis diametrically therethrough and restrained in the socket by seat bushing 96. The lower end of the link is pivoted on a pin 98 about a horizontal axis to one leg 100 of a bell crank 102 which is affixed via its corner to a shaft 104 which is rotatably mounted on the casting 40.

A three-sided rearwardly extending bracket 106 is affixed to the casting 40. Extending laterally from the opposite arms of the bracket 106 adjacent the shaft 104 are stubs 108 serving as spring seats. Secured as at 110 by shoulder bolts are arms 111 which carry the stubs 112 also serving as spring seats. Wound about the rotatable shaft 104 on both sides of the arms of the bracket 106 are torsion springs 114 and 116 whose ends engage their respective seats 108 and 112, the spring 114 having a right-hand wind and the spring 116, a left-hand wind, both springs combining to urge the shaft into counter-clockwise rotation and, hence, the locking pin into its upward locked position as shown in phantom in FIG. 5A.

Extending slidably through a horizontal bore 118 in the casting 40 which communicates with the female slot 42 is a sensing pin 120 whose head 122 is disposed outside of the bore 118. A lever or sensing arm 124 is affixed intermediate its ends to a shaft 126 which is rotatably mounted on the arms of the bracket 106. A torsion spring 128 is wound about the shaft 126 and includes end portions which engage spring seats 130 and 132 that extend laterally from an arm of the bracket 106 and the lever 124, respectively. The spring 128 urges the shaft 126 into a clockwise rotation so that the upper end 134 of the sensing lever 124 presses against the head 122 of sensing pin 120 urging the pin inwardly into the female opening 42 as shown in solid lines in FIG. 5A.

Another shaft 136 is also rotatably mounted on the arms of the bracket 106 below the shaft 126. Upon that shaft is affixed a latch 138 also in the form of a bell crank having two legs, a generally upper one 140 and a lower one 142. The upper leg includes an undulated cam surface 144 along its edge and the lower one has a notch 146 in its edge adapted to engage and releasably latch the end of the other arm 148 of the bell crank 102. A torsion spring 150 is wound about the shaft 136 and terminally engages a seat 152 fixed to the bracket 106 and a seat 154 fixed on the lower leg 142 of the latch 138, the latch spring 150 acting to rotate the shaft 136 counterclockwise. In so doing, cam surface 144 is in contact with the lower end 156 of the sensing lever 124 which has been urged into its solid line position pushing the sensing pin 120 inwardly.

In operation, starting with the open position, the locking pin 88 has been drawn down by rotating shaft 104 clockwise so that the bell crank 102 affixed thereto and line 92 draw the pin into the open position as shown in solid lines in the figures. The arm 148 of the bell crank has engaged the notch 146 in the lower leg 142 of the latch member 138 which holds the bell crank in this position against action of springs 114, 116 which attempts to rotate shaft 104 in a counter-clockwise direction. Sensing pin 120 and sensing arm lever acting thereon are held in the position shown in solid lines by the action of spring 128 constantly urging lever 124 to rotate in a clockwise direction.

To initiate the coupling sequence, the male coupler 14 enters the slot 42 in the female coupling, moving forward until the sensing pin 120 is pushed leftward in the drawing, forcing sensing lever 124 to rotate counter-clockwise about shaft 126. The lower end 156, while moving into the position shown by phantom lines, rides on the cam surface 144 of latch lever 138 forcing it to rotate in a clockwise direction around shaft 136. As lever 138 rotates, the lower arm 148 of the bell crank 102 is released and, under the urging of springs 114 and 116, attempts to drive the locking pin 88 upward by means of link 92. At this time, the vertical hole 43 in the male member 14 may not be completely aligned with locking pin 88. However, the springs will force locking pin 88 into the hole in the male member as soon as it becomes sufficiently aligned. The toggle action between the bell crank 102 and the link 92 provides very large forces on locking pin 88 to insure the completion of its upward motion until it is fully engaged. When the locking pin has reached its fully engaged position, the bell crank 102 and link 92 have assumed the position shown by phantom lines in FIG. 50 and in that position pivot pin 98 has moved past the line of centers between shaft 104 and the ball end 94 of link 92 preventing the weight of locking pin 88 from causing any clockwise rotation of shaft 104 which would tend to unlock the pin 88. At that time, the pin in the safety lock assembly (not shown) seats below the locking pin 88 as a safety lock.

To initiate the uncoupling motion, the safety lock pin must first be manually withdrawn by a cable not shown. Shaft 104 is then rotated clockwise manually, withdrawing locking pin 88 through the action of lever 92 being pulled downward by the bell crank 102. The left hand arm 148 of bell crank 102 then rides over the cam surface 158 at the lower leg 142 of latch lever 138 until it can engage the notch 146. At that time, latch lever 138 which constantly tries to rotate counter-clockwise at the urging of spring 136 into the position shown in solid lines will only momentarily move into the position shown in phantom as arm 148 rides up the cam surface. As the male member 14 is withdrawn, spring 128 which is constantly urging sensing lever 124 to rotate in a clockwise direction, returns the upper end 134 and sensing pin 120 to their solid line position. During this motion, as the lower end 156 of sensing lever 124 rides over the cam surface 144 on latch arm 140, it releases bell crank 102 from the notch 146 in latch lever 128. At this time the top of locking pin 88 rides against the lower surface of the male member 14 while the male member is being withdrawn. As soon as the male member is completely withdrawn, locking pin 88 completes its travel to the up-and-closed position. This is the position in which it is desirable to leave the coupler pin.

What is claimed is:

1. In a coupler to releasably couple vehicles end to end including a rear sill structure having a generally horizontal female slot opening therethrough, a male member extending from the front of the vehicle adapted to enter the female slot of a forward vehicle; means to automatically lock said male member in said female slot in response to complete insertion of said male member in said female slot, said locking means including a vertical hole through said male member, a vertical bore in said rear sill structure opening into said female slot, a sensing pin slidably mounted horizontally in said rear sill structure and extending into said female slot in a position opposite its opening through the rear sill structure, a vertical locking pin slidable in said vertical bore, a first means operatively connected to said locking pin urging it upwardly into said female slot, a second means acting on said sensing pin urging it inwardly into said female slot, and latch means interengaging said first and second means acting to retain said locking pin in a retracted position when said sensing pin extends into said female slot, said latch means releasing said locking pin for extension into said vertical hole of said male member when said sensing pin has been engaged by said male member and has been pushed to a position clearing said female slot.

2. The combination of claim 1 wherein said second means includes a sensing lever having upper and lower ends and rotatably mounted intermediate its ends and spring means urging said sensing lever in a clockwise direction wherein said upper end forces said sensing pin inwardly into said female slot.

3. The combination of claim 1 wherein said first means includes a bell crank having a pair of arms joined at a corner and mounted at its corner for rotation on said rear sill structure, a link terminally pivoted to said locking pin and to one of said bell crank arms and spring means urging said bell crank in a counter-clockwise direction.

4. The combination of claim 3 wherein the point pivotally connected said link to said bell crank arm is past the line of centers between the point pivotally connecting said link to said vertical locking pin and the point of rotational mounting of the corner of said bell crank, when said vertical locking pin is in its fully extended locking position in the vertical hole of the male member, to provide a safety against unintentional downward movement of the vertical locking pin.

5. The combination of claim 3 wherein said latch means is a bell crank having upper and lower legs joined at a corner and rotatably mounted at its corner, cam means on said upper leg engaging said lower end of said sensing lever, and spring means urging said latch bell crank in a counter-clockwise direction.

6. The combination of claim 5 wherein said first means includes a bell crank having a pair of arms joined at a corner and mounted at its corner for rotation on said rear sill structure, a link terminally pivoted to said locking pin and to one of said bell crank arms and spring means urging said bell crank in a counter-clockwise direction, said lower leg of said latch bell crank including a notch releasably engaging one of said arms of said first-mentioned bell crank when said vertical locking pin is completely retracted.

7. In a coupler to releasably couple vehicles end to end including a rear sill structure having a generally horizontal female slot opening therethrough, a male member extending from the front of the vehicle adapted to enter the female slot of a forward vehicle; means to automatically lock said male member in said female slot in response to complete insertion of said male member in said female slot, said locking means including a vertical hole through said male member, a vertical bore in said rear sill structure opening into said female slot, a sensing pin slidably mounted horizontally in said rear sill structure and extending into said female slot in a position opposite its opening through the rear sill structure, a vertical locking pin slidable in said vertical bore, a first bell crank having a pair of arms extending from a corner and mounted at its corner for rotation on said rear sill structure, link means pivotally interconnecting one arm and said vertical locking pin, spring means urging said first bell crank in a counter-clockwise direction and said vertical locking pin upwardly into said female slot, a sensing lever having upper and lower ends and mounted for rotation intermediate its ends, said upper end bearing against said sensing pin, spring means urging said sensing lever into a clockwise direction so that said sensing pin is forced into said female slot, and a second bell crank including upper and lower legs extending from a corner and mounted for rotation at its corner, cam means on said upper leg of said second bell crank engaging said lower end of said sensing lever, a releasable latch notch on said lower leg of second bell crank, and spring means urging said second bell crank in a counter-clockwise direction so that said latch notch engages the other arm of said first bell crank when said vertical locking pin is fully retracted, said sensing lever acting via said cam means on said second bell crank to rotate it in a clockwise direction and release said other arm of said first bell crank from said latch notch when said male coupler member has engaged and pushed said sensing pin outwardly to clear said female slot.

8. The combination of claim 7 wherein said lower leg of said second bell crank includes a cam surface adjacent said notch over which said other arm of said first bell crank rides to ultimately engage said notch.

* * * * *